US009664083B2

(12) United States Patent
Khaled et al.

(10) Patent No.: US 9,664,083 B2
(45) Date of Patent: May 30, 2017

(54) VIRTUAL REDUCTANT LEVEL SENSOR

(71) Applicant: Cummins Emission Solutions Inc., Columbus, IN (US)

(72) Inventors: Nassim Khaled, Columbus, IN (US); Bryce R. Larson, Seymour, IN (US); Sarang S. Sonawane, Pune (IN); Tushar H. Sharma, Pune (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 105 days.

(21) Appl. No.: 14/826,678

(22) Filed: Aug. 14, 2015

(65) Prior Publication Data

US 2017/0044949 A1    Feb. 16, 2017

(51) Int. Cl.
*F01N 3/20*       (2006.01)
*F01N 3/28*       (2006.01)
*F01N 11/00*     (2006.01)

(52) U.S. Cl.
CPC ............ *F01N 3/208* (2013.01); *F01N 3/2896* (2013.01); *F01N 11/00* (2013.01); *F01N 2550/05* (2013.01); *F01N 2610/02* (2013.01); *F01N 2610/1406* (2013.01); *F01N 2610/148* (2013.01); *F01N 2900/0408* (2013.01); *F01N 2900/1814* (2013.01)

(58) Field of Classification Search
CPC ........ F01N 3/208; F01N 3/2896; F01N 11/00; F01N 2610/1406; F01N 2550/05; F01N 2610/148; F01N 2900/0408; F01N 2900/1814
USPC ....................................................... 73/114.75
See application file for complete search history.

(56) References Cited

U.S. PATENT DOCUMENTS

| 7,542,879 | B2 | 6/2009 | Grichnik et al. |
| 7,665,347 | B2* | 2/2010 | Sasanuma ............. F01N 3/2066 73/61.46 |
| 7,856,305 | B2 | 12/2010 | Eiraku |
| 7,975,470 | B2* | 7/2011 | Hirata ................ B01D 53/9431 60/277 |

(Continued)

FOREIGN PATENT DOCUMENTS

EP        2 840 240       2/2015

OTHER PUBLICATIONS

International Search Report and Written Opinion for PCT/US2016/045532, Issued Oct. 21, 2016, 14 Pages.

*Primary Examiner* — Freddie Kirkland, III
(74) *Attorney, Agent, or Firm* — Foley & Lardner LLP

(57) ABSTRACT

An aftertreatment system comprises a reductant storage tank and a SCR system fluidly coupled thereto. A reductant physical level sensor and a tank temperature sensor are operatively coupled to the reductant storage tank. A controller is communicatively coupled with each of the sensors and configured to: interpret a first level output value from the physical level sensor and a first temperature output value from the tank temperature sensor. If the first level output value is below a first threshold, the controller determines if the first temperature output value is below a second threshold. If the first level output value is below the first threshold and the first temperature output value is below the second threshold, the controller determines a virtual reductant level in the reductant storage tank and indicates the virtual reductant level in lieu of a physical reductant level in the reductant storage tank to a user.

25 Claims, 7 Drawing Sheets

(56) References Cited

U.S. PATENT DOCUMENTS

| | | |
|---|---|---|
| 8,757,105 B2 | 6/2014 | Kumar et al. |
| 9,243,755 B2 * | 1/2016 | Lawrence ............. F01N 3/2066 |
| 9,399,940 B2 * | 7/2016 | Liljestrand ............. F01N 3/208 |
| 9,404,408 B2 * | 8/2016 | Bauer .................... B01D 53/90 |
| 2004/0073386 A1 | 4/2004 | Benedetti |
| 2007/0113625 A1 * | 5/2007 | Sasanuma ............. F01N 3/2066 |
| | | 73/61.46 |
| 2007/0266703 A1 * | 11/2007 | Hirata ................ B01D 53/9431 |
| | | 60/299 |
| 2010/0050603 A1 | 3/2010 | Seino et al. |
| 2010/0089037 A1 | 4/2010 | Bogema et al. |
| 2012/0291421 A1 | 11/2012 | Darr et al. |

* cited by examiner

VIRTUAL REDUCTANT LEVEL SENSOR

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and $NO_2$ in some fraction) into harmless nitrogen gas ($N_2$) and water vapor ($H_2O$) in the presence of ammonia ($NH_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

An exhaust reductant is generally inserted into SCR system as the source of ammonia to facilitate the reduction of constituents of the exhaust gas (e.g., a diesel exhaust gas). The exhaust reductant is stored in a reductant storage tank and communicated to the SCR system. The reductant generally includes an aqueous solution such as an aqueous urea solution. A reductant physical level sensor is included in the reductant storage tank which can include, for example an ultrasonic reductant level sensor. Under certain conditions, the reductant physical level sensor may provide unreliable readings and/or a false low level warning of the reductant in the storage tank.

For example, in freezing or sub-zero environmental conditions, the reductant in the storage tank can freeze. A heater is generally provided in the reductant storage tank to thaw the reductant. However, in conventional reductant storage tanks, the heater is positioned at a location in the reductant storage tank, for example at a base of the reductant storage tank so that the reductant near the base of the reductant storage tank melts and becomes a liquid first before a bulk of the reductant is thawed. In other words, the reductant storage tank can be fully or substantially filled with the reductant but only a small portion of the reductant is in liquid phase. This situation can persist for some time before all the reductant thaws and melts.

The ultrasonic waves generated by the physical level sensor are only reflected by a portion of the reductant which is liquid while a frozen and still unthawed portion of the reductant does not reflect the ultrasonic waves. In such circumstances, the physical level sensor falsely indicates a level of the liquid portion of the reductant as the total level of the reductant in the reductant storage tank at any given point in time. If this level is below a threshold level or critical level, a reductant low level indication is erroneously indicated to the user.

SUMMARY

Embodiments described herein relate generally to systems and methods of determining a virtual reductant level in a reductant storage tank, and in particular to identifying a frozen state of a reductant in a reductant storage tank included in an aftertreatment system and determining a virtual reductant level in lieu of an actual physical reductant level measured by a physical level sensor included in the reductant storage tank.

In a first set of embodiments, an aftertreatment system comprises a reductant storage tank. A SCR system, which includes at least one catalyst, is fluidly coupled to the reductant storage tank. A reductant physical level sensor is operatively coupled to the reductant storage tank. A tank temperature sensor is also operatively coupled to the reductant storage tank. A controller is communicatively coupled with each of the reductant physical level sensor and the tank temperature sensor. The controller is configured to interpret a first level output value from the physical level sensor which is indicative of a physical level of a liquid portion of a reductant in the reductant storage tank. The controller interprets a first temperature output value from the tank temperature sensor which is indicative of a temperature of the reductant in the reductant storage tank. If the first level output value is below a first threshold, the controller determines if the first temperature output value is below a second threshold. If it is determined that the first level output value is below the first threshold and the first temperature output value is below the second threshold, the controller determines a virtual reductant level in the reductant storage tank and indicates the virtual reductant level in lieu of an actual physical level of the reductant in the reductant storage tank to a user.

In another set of embodiments, a control module comprises a physical level sensor module configured to receive a first level output value from a physical level sensor operatively coupled to a reductant storage tank. The first level output value is indicative of a physical level of a liquid portion of a reductant in the reductant storage tank. A virtual level sensor module is configured to determine a virtual level of the reductant in the reductant storage tank. A determination module is operatively coupled to the physical level sensor module, the virtual level sensor module, and a temperature sensor. The determination module is configured to interpret the first level output value and a first temperature output value from the temperature sensor. If the first level output value is below a first threshold, the determination module determines if the first temperature output value is below a second threshold. If it is determined that the first level output value is below the first threshold and the first temperature output value is below the second threshold, the determination module determines a virtual reductant level in the reductant storage tank and instructs the virtual level sensor module to indicate the virtual reductant level to a user.

In yet another set of embodiments, a method for identifying a reductant freezing condition in a reductant storage tank having a physical level sensor and a tank temperature sensor operatively coupled thereto and for indicating a virtual reductant level in the reductant storage tank comprises interpreting a first level output value from the physical level sensor. The first level output value is indicative of a physical level of a liquid portion of a reductant in the reductant storage tank. A first temperature output value from the tank temperature sensor is interpreted which is indicative of a temperature of the reductant in the reductant storage tank. It is determined if the first level output value is below a first threshold. If the first level output value is determined to be below the first threshold, it is determined if the first temperature output value is below a second threshold. If the first level output value is determined to be below the first threshold and the first temperature output value is determined to be below the second threshold, a virtual reductant level is determined, and the virtual reductant level is indicated to a user.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
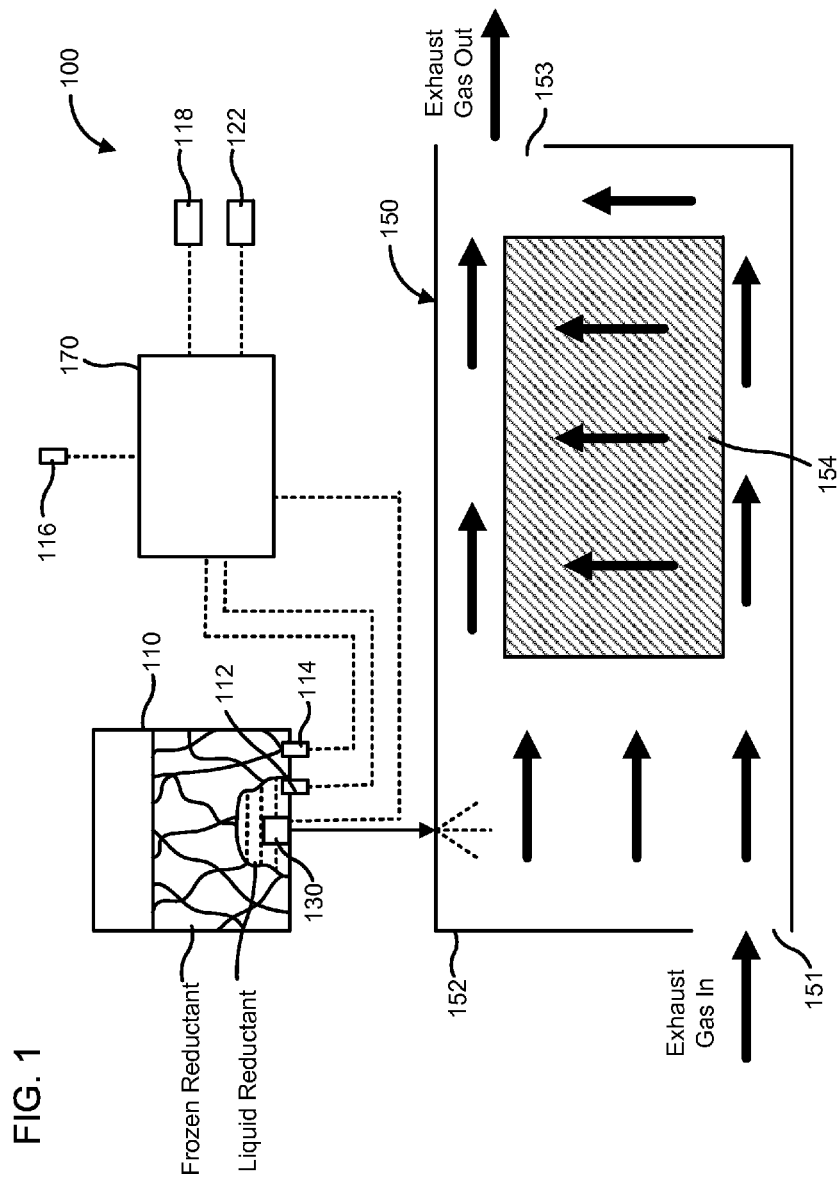
FIG. 1 is a schematic illustration of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods of determining a virtual reductant level in a reductant storage tank, and in particular to identifying a frozen state of a reductant in a reductant storage tank included in an aftertreatment system and determining a virtual reductant level in lieu of an actual physical reductant level measured by a physical level sensor included in the reductant storage tank.

Various embodiments of the systems and methods for detecting a frozen state of a reductant in a reductant storage tank included in an aftertreatment system and providing a virtual reductant level may provide benefits including, for example: (1) identifying a frozen state of a reductant in a reductant storage tank included in an aftertreatment system; (2) providing a virtual reductant level in lieu of an actual physical reductant level in the reductant storage tank; (3) preventing false indication of a reductant low level in the reductant storage tank due to inability of a physical level sensor to measure an accurate reductant level of a frozen reductant in the reductant storage tank; (4) periodically checking if the physical level sensor is providing a correct level of the reductant i.e., returning to functioning properly; and (5) indicating a reductant physical level measured by the physical level sensor once the reductant in the reductant storage tank has substantially thawed so that the physical level sensor returns to providing an accurate assessment of the reductant level in the reductant storage tank.

FIG. 1 is a schematic illustration of an aftertreatment system 100, according to an embodiment. The aftertreatment system 100 is configured to receive an exhaust gas (e.g., a diesel exhaust gas) from an engine (e.g., a diesel engine) and reduce constituents of the exhaust gas such as, for example, NOx gases, CO, etc. The aftertreatment system 100 includes an exhaust reductant storage tank 110, a reductant physical level sensor 112, a tank temperature sensor, a tank heater 130, a SCR system 150, a controller 170, and optionally a vehicle speed sensor 116, an ambient temperature sensor 118 and a printed circuit board (PCB) sensor 122.

The reductant storage tank 110 (also referred to herein as tank 110) contains an exhaust reductant formulated to facilitate reduction of the constituents of the exhaust gas (e.g., NOx) by a catalyst 154 included in the SCR system 150. In embodiments in which the exhaust gas is a diesel exhaust gas, the exhaust reductant can include a diesel exhaust fluid (DEF) which provides a source of ammonia. Suitable DEFs can include urea, aqueous solution of urea or any other DEF (e.g., the DEF available under the tradename ADBLUE®).

The heater 130 is operatively coupled to the tank 110 and configured to heat the reductant contained within the tank 110. Under cold, freezing or sub-zero weather conditions the reductant or at least a portion of the reductant contained within the reductant storage tank 110 can freeze. For example, the aftertreatment system 100 can be included in a vehicle which is exposed to the freezing weather conditions. When the vehicle is turned off or otherwise not operational, the reductant in the tank 110 freezes. When the vehicle is turned on, the heater 130 is switched on to thaw or melt the reductant. In particular embodiments, the heater 130 can be located inside the tank 110 (e.g., located proximal to or on a base of the tank 110) or positioned outside the tank 110 proximal to a base of the tank 110 so that a portion of the reductant proximate to the heater 130 melts first. However, it takes a certain amount of time for all or substantially all (e.g., greater than 90% of the volume of the reductant contained within the tank 110) of the reductant to thaw. Particularly, when the heater 130 is first turned on, a first portion of the reductant proximal to the heater 130 is liquid and a second portion of the reductant distal from the heater 130 is frozen.

Any suitable heater 130 can be used. In some embodiments, the heater 130 includes an electric heater. In other embodiments, the heater 130 includes a conduit or tube operatively coupled to the tank 110 and configured to communicate a heated heat exchange fluid (e.g., an engine coolant) or the hot exhaust gas through the tank 110 to heat the reductant.

The reductant physical level sensor 112 (also referred to as the physical level sensor 112) is operatively coupled to the tank 110. The physical level sensor 112 can include an ultrasonic level sensor configure to propagate ultrasonic waves through the reductant contained within the tank 110, and use reflected ultrasonic waves from the reductant to determine a physical level of reductant in the tank 110. The ultrasonic waves generated by the physical level sensor 112 only reflect from the liquid portion of the reductant. Therefore, under conditions in which the reductant is at least partially frozen, for example the reductant includes the liquid first portion and the frozen second portion, the ultrasonic waves only reflect from the liquid first portion. In such situations, the physical level sensor erroneously determines the level of the first liquid portion as a total level of reductant in the tank 110.

In situations where the level of the liquid first portion is below a predetermined critical or threshold level of reductant in the tank 110, the physical level sensor 112 can determine and/or indicate the total level of reductant in the tank 110 has fallen below the critical level. In other words, even though the actual level of the reductant in the tank 110 is above the critical or threshold level, the physical level sensor 112 measures and indicates that the reductant level in the tank 110 has fallen below the critical or threshold level or otherwise indicate that the tank 110 is substantially empty (e.g., the volume of reductant in the tank 110 is below 10% of the total volumetric capacity of the tank 110). This can be indicated to a user, for example using a level gage (e.g., a reductant level gage installed on vehicle) or a critical reductant level indicator lamp which can be included in the level gage or provided separately.

The tank temperature sensor 114 (also referred to as the temperature sensor 114) is also operatively coupled to the tank 110 and configured to measure a temperature of the reductant contained within the tank 110. The temperature sensor 114 can include a thermocouple, a thermistor or any other suitable temperature sensor.

The SCR system 150 is configured to receive and treat the exhaust gas (e.g., a diesel exhaust gas) flowing through the SCR system 150. The SCR system 150 is fluidly coupled to the storage tank 110 to receive the exhaust reductant from the storage tank 110. The SCR system 150 includes a housing 152 defining an inlet 151 for receiving the exhaust gas from an engine, and an outlet 153 for expelling treated exhaust gas. The SCR system 150 includes at least one catalyst 154 positioned within an internal volume defined by the housing 152. The catalyst 154 is formulated to selectively reduce constituents of the exhaust gas, for example, NOx included in the exhaust gas in the presence of an exhaust reductant. Any suitable catalyst 154 can be used such as, for example, platinum, palladium, rhodium, cerium, iron, manganese, copper, vanadium based catalysts (including combinations thereof).

The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials can include, for example, aluminum oxide, titanium dioxide, silicon dioxide, any other suitable washcoat material, or a combination thereof. The exhaust gas can flow over and about the catalyst 154 such that any NOx gases included in the exhaust gas are further reduced to yield an exhaust gas which is substantially free of carbon monoxide and NOx gases.

The controller 170 is communicatively coupled to the physical level sensor 112 and the temperature sensor 114 and is configured to receive and interpret output values or signals generated by each of the physical level sensor 112 and the temperature sensor 114. More specifically, the controller 170 is configured to interpret a first level output value from the physical level sensor 112. The first level output value is indicative of a level of a liquid portion of the reductant in the tank 110, as described before herein. The controller 170 is also configured to interpret a first temperature output value from the temperature sensor 114. The first temperature output value is indicative of the temperature of the reductant in the tank 110.

The controller 170 determines if the first level output value is below a first threshold. In various embodiments, the first threshold includes the critical or threshold level of reductant in the tank 110, as described herein. If the first level output value is below the first threshold, the controller 170 determines if the first temperature output value is below a second threshold. In various embodiments, the second threshold can include a freezing temperature of the reductant (e.g., +4 degrees Celsius, 0 degrees Celsius, −5 degrees Celsius, −10 degrees Celsius or −15 degrees Celsius inclusive of all ranges and values therebetween).

If the controller 170 determines that the first level output value is below the first threshold and the first temperature output value is below the second threshold, the controller 170 determines a virtual reductant level in the tank 110. The controller 170 indicates the virtual reductant level in lieu of an actual physical level of the reductant in the tank 110 to the user, for example via the level gage. In one embodiment, the virtual reductant level corresponds to a previous level output value from the physical level sensor 112 which is indicative of an acceptable reductant level in the tank 110.

Expanding further, if the first level output value is below the first threshold, this can imply either that the reductant level in the tank 110 is actually below the critical level or a significant portion of the reductant in the tank is frozen, leading to a malfunction of the physical level sensor 112, as described before herein. The controller 170 then determines if the first temperature output value is below the second threshold. If the second temperature output value is below the second threshold, it indicates that freezing conditions exist and that a substantial portion of the reductant in the storage tank can be frozen.

The controller 170 then determines a previous or last known good level output value which was measured by the physical level sensor 112. For example, the previous level output value can be level output value or reading from the physical level sensor 112 just before the aftertreatment system 100 was turned off (e.g., a vehicle which includes the aftertreatment system 100 was turned off). The controller 170 uses the previous output value as the virtual reductant level, which is a more accurate representation of the actual level of the reductant in the tank 110 relative to the physical reductant level measured by the physical level sensor 112, and is indicated to the user in lieu of the physical level sensor 112 measurement. In case the reductant level was actually low when the previous level output was measured by the physical level sensor and freezing conditions also exist, the virtual reductant level indicated to the user will also indicate that the reductant level is critically low. In this manner, the controller 170 prevents an erroneous indication of a critically low reductant level detected by the physical level sensor 112 to the user.

In some embodiments, the controller 170 is also configured to interpret a second temperature output value from the temperature sensor 114 a first predetermined time after interpreting the first temperature output value. The first time can be 1 minute, 2 minutes, 3 minutes, 4 minutes, 5 minutes, 6 minutes, 7 minutes, 8 minutes, 9 minutes or 10 minutes inclusive of all ranges and values therebetween. In one embodiment, the first predetermined time is 5 minutes. If the second temperature output value is below the second threshold, the controller 170 determines a second virtual reductant level in the reductant storage tank using the previous level output value from the physical level sensor 112.

The controller 170 indicates the second virtual level in lieu of the actual physical level of the reductant in the tank 110 to the user. In other words, the controller 170 updates the virtual reductant level after the predetermined time with the second reductant level using the previous level output value if the second temperature output value is also below the second threshold (i.e., a substantial portion of the reductant in the tank 110 is still frozen).

In particular embodiments, the controller 170 determines a reductant consumption value from the previous output value and the first predetermined time. The controller 170 subtracts the reductant consumption value from the previous output value to determine the second virtual reductant level. For example, the controller 170 can include a lookup table or algorithm stored on a computer readable medium which determines an amount of reductant expected to be consumed during the predetermined time. The lookup table or algorithm can be configured to account for operational parameters of the aftertreatment system 100 and/or the engine coupled thereto, for example engine rpm, high load conditions, engine idling conditions, ambient temperature, etc. which can affect one or more operational parameters of the exhaust gas flowing though the aftertreatment system 100 and, thereby the amount of reductant inserted into the SCR system 150. The expected amount of reductant consumed is deducted from the previous reductant level to account for the reductant level consumption. This process can be repeated as many times as necessary until, for example, the reductant in the tank 110 is completely thawed and the physical reductant sensor 112 begins to function properly, as described herein.

In further embodiments, the controller 170 is further configured to interpret a third temperature output value from the temperature sensor 114 a second predetermined time after interpreting the second temperature output value. In some embodiments, the second predetermined time is the same as the first predetermined time (e.g., 5 minutes). In other embodiments, the second predetermined time is shorter than the first predetermined time (e.g., about 4 minutes, 3 minutes, 2 minutes or 1 minute inclusive of all ranges and values therebetween).

If the third temperature output value is above the second threshold, the controller 170 determines a third virtual reductant level using a second level output value measured by the physical level sensor 112. The second level output value is indicative of a most recent actual physical level of the reductant in the tank 110. That is, if third temperature output value exceeds the second threshold, this is an indication that the reductant in the reductant storage tank is thawed or melted, which in turn indicates that the physical level sensor 112 may be functioning properly.

In particular embodiments, the second virtual reductant level is updated to the third virtual reductant level only if the second level output value or otherwise the physical reductant level is within a predetermined range of the second virtual reductant level (e.g., within a 2% to 12% range inclusive of all ranges and values therebetween). However, the controller 170 still indicates the virtual reductant level to the user to avoid situations in which the second level output value was incorrectly measured by the physical level sensor 112, or the physical level sensor 112 malfunctioned. In other words, the controller 170 persists with indicating the virtual reductant level to the user rather than immediately switching to the actual reductant level measurements by the physical level sensor 112 until it is consistently determined over multiple cycles (e.g., 2, 3, 4 or more cycles) that the physical level sensor 112 level output values or otherwise measurements are comparable to the virtual reductant level.

Moreover, if the second level output value or otherwise the actual physical reductant level is not comparable with the second reductant level (e.g., the actual physical reductant level is less than the second virtual reductant level by greater than the predetermined range), the controller 170 calculates the third virtual reductant level using the second virtual reductant level by deducting an estimated consumed amount of reductant during the passage of the second predetermined time, as described before herein.

Furthermore, the controller 170 can be further configured to interpret a fourth temperature output value from the temperature sensor 114 a third predetermined time after interpreting the third temperature output value. The third predetermined time can be the same or different from the second predetermined time. If the fourth temperature output value is also above the second threshold, the controller 170 interprets a third level output value from the physical level sensor 112 which is indicative of a most recent actual physical level of the reductant in the tank 110. The controller 170 determines the actual physical level of the reductant in the tank 110 using the third level output value and indicates the actual physical reductant level to the user. The third predetermined time can be the same or different from the second predetermined time.

In particular embodiments, the controller 170 only reports the actual physical reductant level to the user if the third level output value is comparable to the virtual reductant level, for example within the predetermined range. In still other embodiments, if the actual reductant level is below the critical or threshold level, as described above, the controller 170 persists with indicating the virtual reductant level until the virtual reductant level also drops below the critical or threshold level. The controller 170 can then switch to indicating the actual physical level measured by the physical level sensor 112 the user.

The controller 170 can include a processor (e.g., a microcontroller) programmed to interpret the output signal. In some embodiments, the controller 170 can be included in a control module (e.g., the control module 271 described herein) which is in electrical communication one or more of the components of the aftertreatment system 100 described herein and operable to perform the sensing and control functions described herein. In particular embodiments, the controller 170 can also be configured to receive and interpret data from, temperature sensors, NOx sensors, oxygen sensors and/or ammonia sensors, each of which can be included in the aftertreatment system 100.

In various embodiments, the controller 170 is also communicatively coupled to the tank heater 130, the vehicle speed sensor 116, the ambient temperature sensor 118 and the PCB temperature sensor 122. In such embodiments, the controller 170 is configured to use signals or output values from one or more of the tank heater 130, the vehicle speed sensor 116, the ambient temperature sensor 118 and the PCB temperature sensor 122 to determine a tank frozen condition or an indication that the reductant or at least a portion of the reductant contained within the tank 110 is frozen.

Expanding further, the controller 170 can be configured to interpret a vehicle speed sensor output value to determine a vehicle speed, an ambient temperature sensor output value to determine an ambient temperature, a tank heater 130 or heater 130 output value indicating whether the heater 130 is on or off, and/or a PCB sensor output value to determine a PCB temperature. In one embodiment, the PCB can include a PCB or electronic circuit board associated with an injector or doser associated with tank 110. In other embodiments, the PCB can include an electronic circuit board of the controller 170 or any other control unit associated with the aftertreatment system 100.

Using the at least one of the vehicle speed, the ambient temperature, the tank heater output value and the PCB temperature, the controller 170 determines if the reductant contained within the tank 110 is frozen. For example, the controller 170 can determine that the tank is frozen if the heater is ON, the PCB temperature and/or the ambient temperature is below the second threshold, and/or if the vehicle speed is above a vehicle speed threshold but no sloshing of the reductant (i.e., no splashing of reductant) is determined in the tank 110.

In various embodiments, the controller 170 can be configured to determine that the reductant in the tank 110 frozen if the following conditions are satisfied: the first temperature output value of the tank temperature sensor is below the second threshold or the tank heater is on; and the virtual reductant level determined by the controller is greater than a physical reductant level of the reductant by a predetermined value indicated by the first level output value of the physical level sensor. The predetermined value can be in the range of 2% to 12% of the physical reductant level (e.g., about 10%).

In other embodiments, the controller 170 is configured to determine that the reductant in the tank 110 is not frozen if the first temperature output value of the temperature sensor 114 is above the second threshold or the heater 130 is on and the virtual reductant level determine by the controller 170 is within a predetermined range of a physical reductant level of the reductant, indicated by the first output value of the physical level sensor 112 and any one of the following conditions are satisfied: an ambient temperature is above an ambient temperature threshold and a PCB temperature is above a PCB temperature threshold; or if the vehicle is moving, there is an indication of sloshing of the reductant in the tank 110 which is above a sloshing threshold; or if the vehicle is stationary, an expiration of a tank frozen time has occurred (e.g., the heater 130 has been ON for a sufficient time so that substantially all of the reductant in the tank 110 is expected to be thawed).

Figure 2:
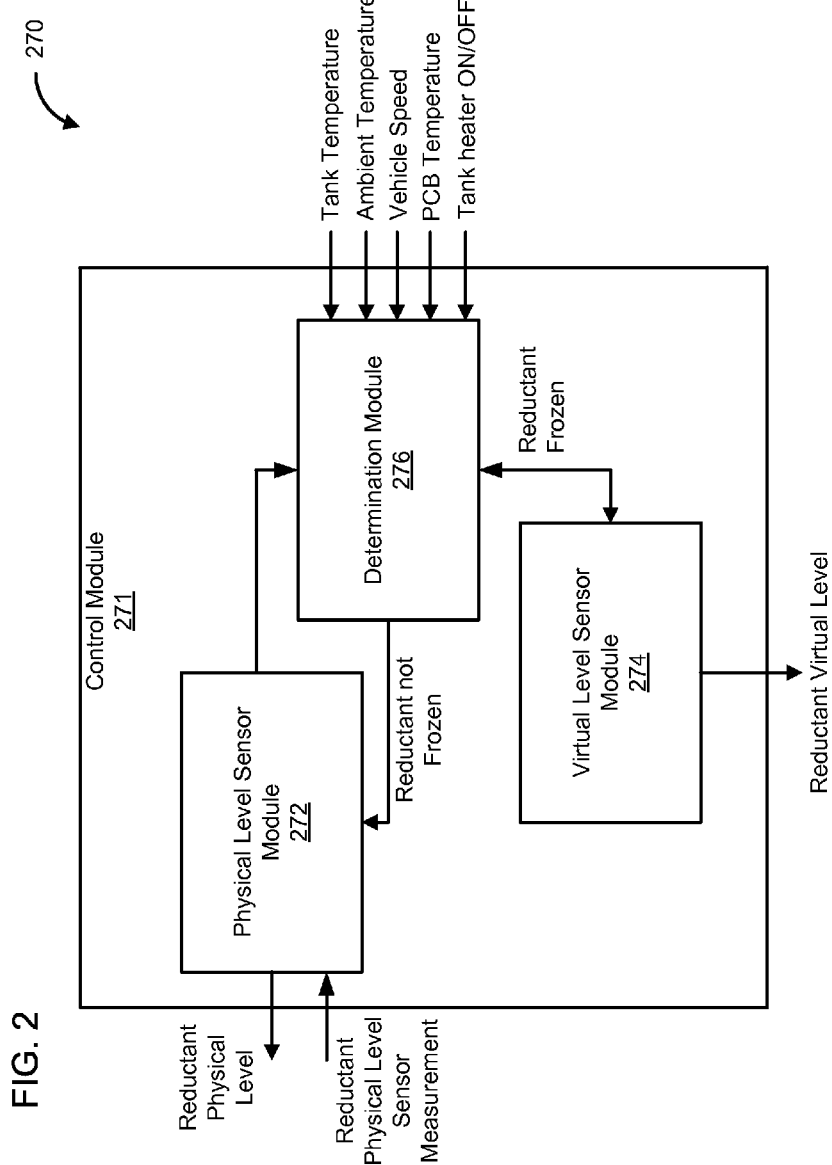
FIG. 2 is a schematic block diagram of one embodiment of a control module which can be included in a controller of on aftertreatment system.

In some embodiments, the controller 170 can be a system computer of an apparatus or system which includes the aftertreatment system 100 (e.g., a vehicle or generator set, etc.). Such a computer can include, for example the computing device 730 described in detail herein with respect to FIG. 7. In particular embodiments, the controller 170 can include a control module which is in electrical communication with one or more of the components of the aftertreatment system 100 described herein and operable to perform the sensing functions described herein. For example, FIG. 2 is a schematic block diagram of a control module 271 which can be included in a controller 270. The control module 271 includes a physical level sensor module 272, a virtual level sensor module 274 and a determination module 276.

The physical level sensor module 272 is configured to receive a first level output value from a physical level sensor (e.g., the physical level sensor 112 described before herein) which is operatively coupled to a reductant storage tank or tank (e.g., the tank 110). The first level output value is indicative of a physical level of a liquid portion of a reductant in the tank, as described before herein with reference to the physical level sensor 112 included in the aftertreatment system 100. In other embodiments, the physical level sensor module 272 can also be configured to receive an output signal from the physical level sensor and determine the first level output value therefrom. The physical level sensor module 272 conveys the first level output value to the determination module 276.

The virtual level sensor module 274 is configured to indicate a virtual reductant level in the tank (e.g., the tank 110), for example when instructed by the determination module 276 as described herein. The determination module 276 is communicatively coupled to each of the physical level sensor module 272 and the virtual level sensor module 274. The determination module is also communicatively coupled to a temperature sensor (e.g., the temperature sensor 114) which is operatively coupled to a reductant storage tank (e.g., the tank 110)) and provides reductant temperature information to the determination module 276.

The determination module 276 is configured to interpret a first level output value from the physical level sensor and a first temperature output value from the temperature sensor. If the first level output value is below a first threshold (e.g., below a critical or threshold level of reductant in the tank), the determination module 276 determines if the second temperature output value is below a second threshold (e.g., below a reductant freezing temperature). If the determination module 276 determines that the first level output value is below the first threshold and the first temperature output value is below the second threshold, the determination module 276 determines a virtual reductant level in the reductant storage tank. The virtual reductant level can correspond to a previous output value from the physical level sensor which is indicative of an acceptable reductant level in the reductant storage tank. The determination module 276 instructs the virtual level sensor module to indicate the virtual reductant level to a user (e.g., via a reductant level gage or reductant level indicator lamp).

In some embodiments, the determination module 276 is further configured to determine a physical reductant level in the tank if the first temperature output value above the second threshold. In this scenario, the determination module 276 instructs the physical level sensor module 272 to indicate the physical reductant level to the user.

In other embodiments, the determination module 276 is further configured to interpret a second temperature output value from the temperature sensor (e.g., the temperature sensor 114) a first predetermined time after interpreting the first temperature output value. The first predetermined time can be 1 minute, 2 minutes, 3 minutes, 4 minutes, 5 minutes, 6 minutes, 7 minutes, 8 minutes, 9 minutes or 10 minutes inclusive of all ranges and values therebetween. In one embodiment the first predetermined time is 5 minutes.

If the second temperature output value is below the second threshold, the determination module 276 determines a second virtual reductant level in the reductant storage tank using the previous output value from the physical level sensor. The determination module 276 then instructs the virtual level sensor module 274 to indicate the second virtual reductant level in lieu of the actual physical level of the reductant in the reductant storage tank to the user. As described before herein, the previous output value from the physical level sensor can be indicative of an acceptable level of reductant in the tank. Furthermore, the determination module 276 or the virtual level sensor module 274 can be configured to determine a reductant consumption value using the previous output value from the physical level sensor and the first predetermined time, as described before with respect to the controller 170. The reductant consumption value is subtracted from the previous output value to determine the second virtual reductant level. This is a more accurate representation of the level of the reductant contained within the tank as it accounts for the amount of reductant which is expected to be consumed by an aftertreatment system (e.g., the aftertreatment system 100) which includes the controller 270.

In still other embodiments, the determination module 276 is further configured to interpret a third temperature output value from the temperature sensor (e.g., the temperature sensor 114) a second predetermined time after interpreting the second temperature output value. If the third temperature output value is above the second threshold, the determination module 276 determines a third virtual reductant level using a second level output value measured by the physical level sensor, which is indicative of a most recent actual physical level of the reductant in the tank. In some embodiments, the second predetermined time is the same as the first predetermined time (e.g., 5 minutes). In other embodiments, the second predetermined time is shorter than the first predetermined time (e.g., about 4 minutes, 3 minutes, 2 minutes or 1 minute inclusive of all ranges and values therebetween).

The determination module 276 can be further configured to interpret a fourth output value from the tank temperature sensor a third predetermined after interpreting the third temperature output value. If the fourth temperature output value is above the second threshold, the determination module 276 interprets a third level output value from the physical level sensor, which is indicative of a most recent actual physical level of the reductant in the tank. The third predetermined time can be same or different than the second predetermined time. The determination module 276 determines the actual physical level of the reductant in the reductant storage tank from the third level output value and instructs the physical level sensor module 272 to indicate the actual physical reductant level to the user.

In various embodiments, the determination module 276 is communicatively coupled to at least one of a vehicle speed sensor, an ambient sensor, a reductant storage tank heater or tank heater, and a PCB temperature sensor. For example, the determination module 276 can be included in a vehicle which includes these components. The determination module 276 is configured to interpret a vehicle speed sensor output value to determine a vehicle speed, an ambient temperature sensor output value to determine an ambient temperature, a tank heater output value (e.g., corresponding to tank heater ON or OFF) and/or a PCB temperature sensor output value to determine a PCB temperature. The determination module 276 uses one or more the vehicle speed, the ambient temperature, the heater output value and the PCB temperature, determine if the reductant contained within the reductant storage tank is frozen.

For example, the determination module 276 can be configured to determine that the reductant in the reductant storage tank is frozen if the following conditions are satisfied: the first temperature output value of the tank temperature sensor is below the second threshold or the tank heater is on, and the virtual reductant level is greater than a physical reductant level of the reductant by a predetermined value, as described before herein with respect to the controller 170 The predetermined value can be any suitable value, for example in the range of 2% to 12% of the physical reductant level (e.g., about 10%).

In still another embodiment, the determination module 276 is configured to determine that the reductant in the reductant storage tank is not frozen if the following conditions are satisfied: the first temperature output value of the tank temperature sensor is above the second threshold or the tank heater is on; the virtual reductant level is within a predetermined range of a physical reductant level, and any one of: an ambient temperature is above an ambient temperature threshold and a PCB temperature is above a PCB temperature threshold; or if the vehicle moving, there is an indication of sloshing of the reductant in the storage tank which is above a sloshing threshold; or if the vehicle is stationary, an expiration of a tank frozen time has occurred, as described before herein with respect to the controller 170.

Figure 3:
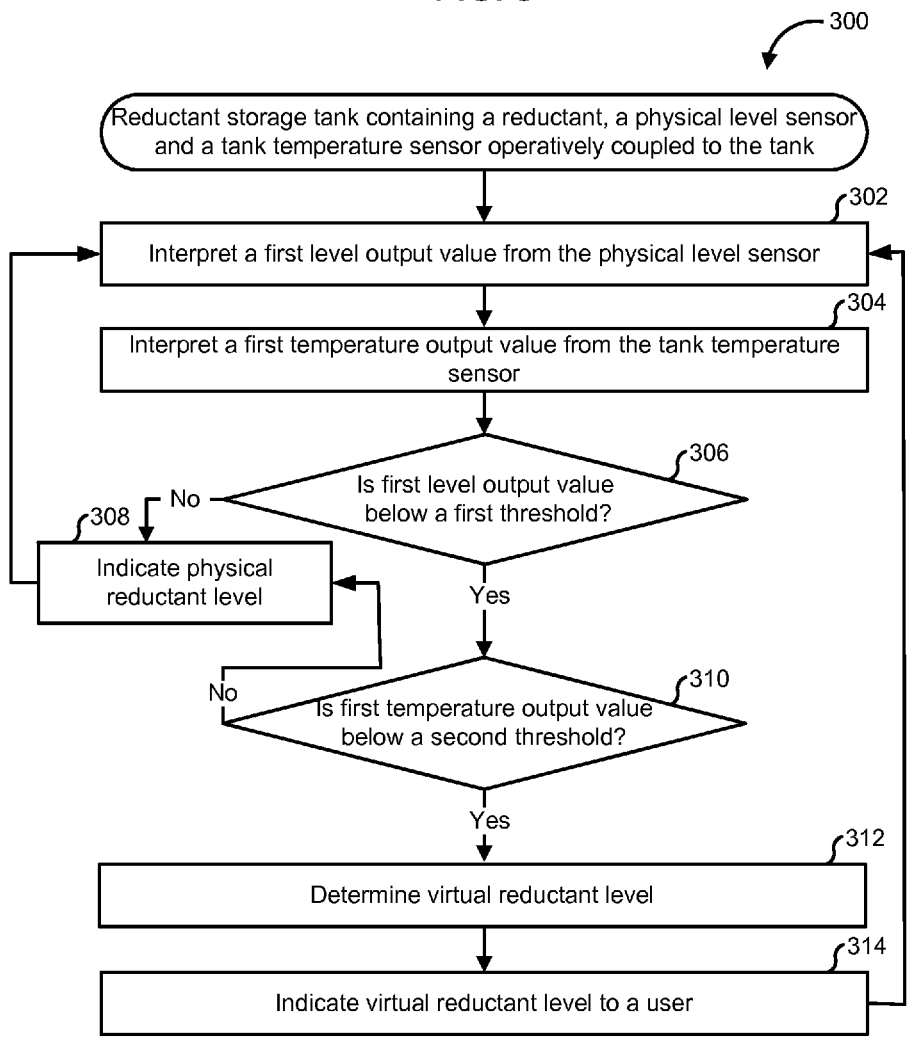
FIG. 3 is a schematic flow diagram of another embodiment of a method for determining a state of a reductant contained within a reductant storage tank, and determining and indicating a virtual reductant level to a user if certain conditions are met.

FIG. 3 is a schematic flow diagram of an example method 300 for determining if a physical reductant level sensor (e.g., the physical level sensor 112) operatively coupled to reductant storage tank or tank (e.g., the tank 110) containing a reductant, is malfunctioning and indicate a virtual reductant level instead of an actual physical level of reductant measured by the physical level sensor. The reductant storage tank also includes a tank temperature sensor or temperature sensor operatively coupled thereto, and can be included in an aftertreatment system, for example the aftertreatment system 100. The operations of the method 300 can be stored in the form of instructions on a non-transitory CRM (e.g., the main memory 736, read only memory (ROM) 738 or storage device 740 included in the computing device 730 of FIG. 7). The CRM can be included in a computing device (e.g., the computing device 730) which is configured to execute the instructions stored on the CRM to perform the operations of the method 300.

The method 300 includes interpreting a first level output value from the physical level sensor at 302. For example, the physical level sensor 112 can generate the first level output value which is indicative of a physical level of a liquid portion of a reductant in the tank 110, and is interpreted by the controller 170 or 270. A first temperature output value from the temperature sensor is interpreted at 304. For example, the controller 170 or 270 can interpret the first temperature output value generated by the temperature sensor 114 which is indicative of the temperature of the reductant in the reductant storage tank 110.

The method 300 determines if the first level output value is below a first threshold at 306. For example, the controller 170 or 270 determines if the first level output value from the physical level sensor 112 is below the first threshold (e.g., below a critical or threshold level of reductant contained within the tank). If the first level output value is determined to be equal to or above the first threshold, the method 300 indicates the physical reductant level at 308, i.e., the physical reductant level measured by the physical level sensor (e.g., the physical level sensor 112).

On the contrary, if the first level output value is determined to be below the first threshold at 306, the method determines if the first temperature output value is below a second threshold at 310, for example, below a freezing temperature of the reductant contained within the reductant storage tank. For example, the controller 170 or 270 can determine from the first temperature output value if the first temperature output value from the temperature sensor 114 is above or below the second threshold. If the first temperature output value is above the second threshold, the method 300 returns to operation 308 and indicates the actual physical reductant level.

In contrast, if the first level output value is below the first threshold and the first temperature output value is below the second threshold, the method 300 determines a virtual reductant level at 312. For example, the controller 170 or 270 can determine the virtual reductant level which corresponds to a previous level output value from the physical level sensor 112 which indicates an acceptable level of reductant in the tank 110.

In particular embodiments, the method 300 can also determine if a reductant contained within the reductant storage tank is frozen. In one embodiment, the method 300 determines that the reductant in the tank (e.g., the tank 110) is at least partially frozen if: the first temperature output value of the temperature sensor (e.g., the temperature sensor 114) is below the second threshold or the tank is being heated; and the virtual reductant level is greater than a physical reductant level of the reductant by a predetermined value (e.g., 2% to 12% greater than the physical reductant level). For example, the controller 170 or 270 can also be operatively coupled to the heater 130 to determine an ON or OFF state of the heater which indicates if the tank 110 is being heated. Furthermore, if the virtual reductant level is greater than the physical reductant level measured by the physical level sensor 112 by greater than the predetermined value (e.g., in the range of 2% to 12%), the method 300 determines that the reductant in the reductant storage tank is frozen.

In some embodiments, the method 300 can also include interpret a second temperature output value from the temperature sensor (e.g., the temperature sensor 114) a first predetermined time after interpreting the first temperature output value. The first time can be 1 minute, 2 minutes, 3 minutes, 4 minutes, 5 minutes, 6 minutes, 7 minutes, 8 minutes, 9 minutes or 10 minutes inclusive of all ranges and values therebetween. In one embodiment, the first predetermined time is 5 minutes. If the second temperature output value is below the second threshold, the method 300 determines a second virtual reductant level in the tank using the previous output value from the physical level sensor, and indicates a second virtual reductant level in lieu of the actual physical level of the reductant in the tank to the user.

In particular embodiments, a reductant consumption value is determined (e.g., by the controller 170 or 270) using the previous output value from the physical level sensor (e.g., the physical level sensor 112) and the first predetermined time. The reductant consumption value is subtracted from the previous output value from the physical level sensor to determine the second virtual reductant level.

In other embodiments, the method 300 also includes interpreting a third temperature output value from the temperature sensor a second predetermined time after interpreting the second temperature output value. The second predetermined time can the same as the first predetermined time (e.g., 5 minutes), or shorter than the first predetermined time (e.g., about 4 minutes, 3 minutes, 2 minutes or 1 minute inclusive of all ranges and values therebetween). If the third temperature output value is above the second threshold, a third virtual reductant level is determined using a second level output value measured by the physical level sensor (e.g., the physical level sensor 112) which is indicative of a most recent actual physical level of reductant in the tank (e.g., the tank 110).

In still other embodiments, the method 300 includes interpreting a fourth temperature output value from the temperature sensor (e.g., the temperature sensor 114) a third predetermined time after interpreting the third temperature output value. The third predetermined time can be the same or different from the second predetermined time. If the fourth temperature output value is above the second threshold, a third level output value from the physical level sensor (e.g., the physical level sensor 112) is interpreted which is indicative of a most recent actual physical level of reductant in the reductant storage tank. The actual physical level of reductant in the tank is determined and indicated to the user.

In yet other embodiments, the method 300 includes interpreting at least one of a vehicle speed sensor output value to determine a vehicle speed, an ambient temperature sensor output value to determine an ambient temperature, a heater output value to determine if the heater is ON or OFF, and a PCB temperature sensor output value to determine a PCB temperature. In such embodiments, the method 300 includes using the at least one of the vehicle speed, the ambient temperature, the tank heater output value and the PCB temperature, determine if the reductant contained within the reductant storage tank is frozen.

For example, the method 300 can determine that the reductant in the reductant storage tank is at least partially frozen if the first temperature output value of the temperature sensor (e.g., the temperature sensor 114) is below the second threshold or the reductant storage tank (e.g., the tank 110) is being heated, and the virtual reductant level is greater than a physical reductant level of the reductant by a predetermined value.

In another embodiment, the method 300 can determine that the reductant in the reductant storage tank is not frozen if the following conditions are satisfied: the first temperature output value of the tank temperature sensor is above the second threshold or reductant storage tank is being heated; and the virtual reductant level is within a predetermined range of a physical reductant level; any one of an ambient temperature is above an ambient temperature threshold and a PCB temperature is above a PCB temperature threshold; if the vehicle moving, there is an indication of sloshing of the reductant in the tank which is above a sloshing threshold; or if the vehicle being stationary, an expiration of a tank frozen time has occurred.

Figure 4:
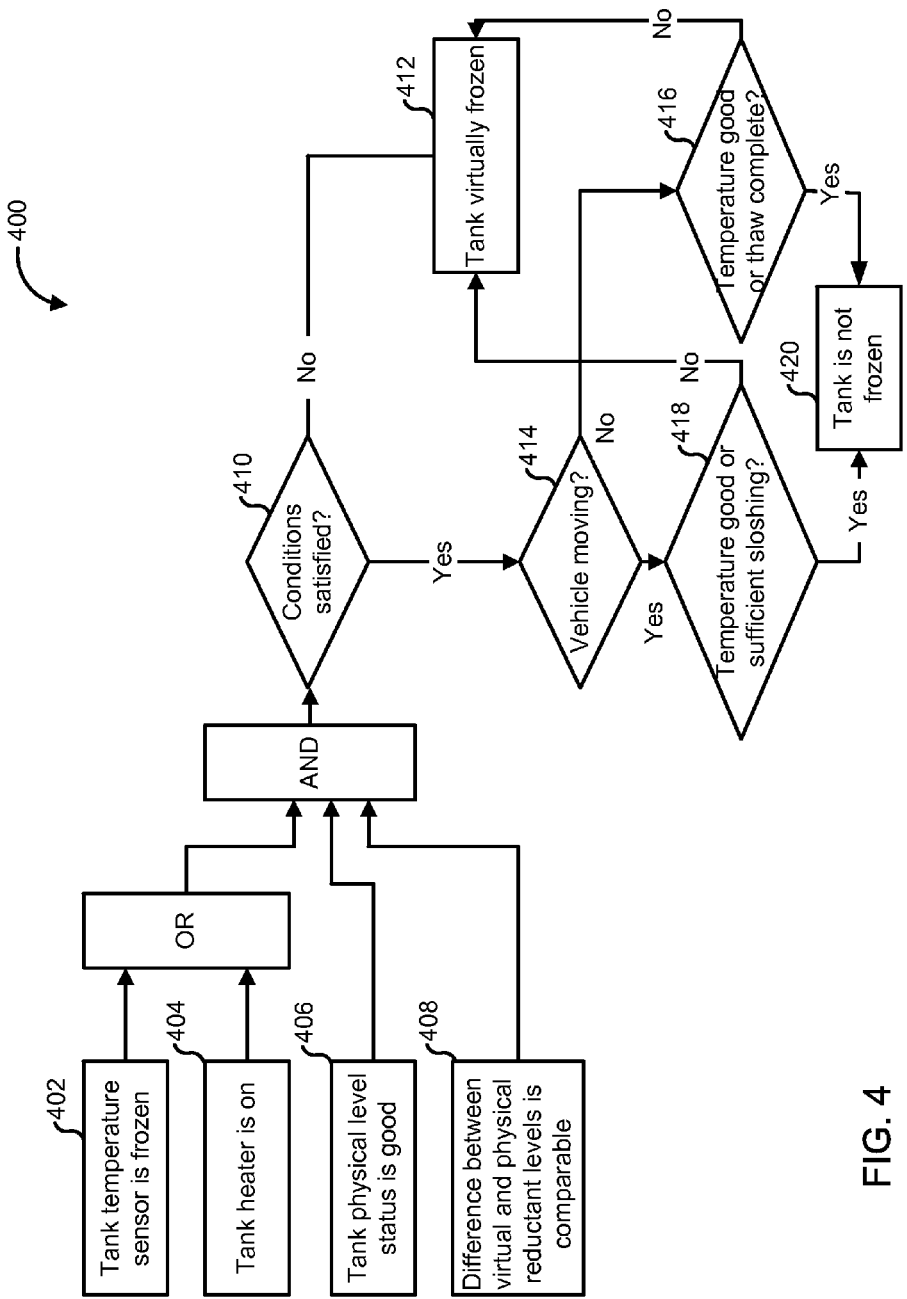
FIG. 4 is a schematic flow diagram of yet another embodiment of a method for determining a tank frozen condition or reductant contained within a reductant storage tank is frozen condition.

FIG. 4 is a schematic flow diagram of an example method 400 for determining if a reductant contained within a reductant storage tank which can be included in an aftertreatment system (e.g., the aftertreatment system 100) and which includes a physical level sensor and a temperature sensor coupled thereto, is frozen. The operations of the method 400 can be stored in the form of instructions on a non-transitory CRM (e.g., the main memory 736, read only memory (ROM) 738 or storage device 740 included in the computing device 730 of FIG. 7). The CRM can be included in a computing device (e.g., the computing device 730) which is configured to execute the instructions stored on the CRM to perform the operations of the method 400.

The method 400 includes determining if a tank temperature sensor is frozen at 402 or if a tank heater is ON at 404. For example, the controller 170 or 270 can interpret the first temperature output value from the temperature sensor 114 and determine if the temperature sensor 114 is measuring a reductant temperature which is less than a freezing temperature of the reductant (e.g., less than +4 degrees Celsius, less than 0 degrees Celsius, less than −5 degrees Celsius, less than −10 degrees Celsius or less than −15 degrees Celsius) and if the heater 130 is ON, i.e., is heating the reductant in the reductant storage tank.

If at least one of operation 402 and operation 404 is satisfied, the method 400 also determines if a tank physical level is good at 406 and if a difference between a virtual reductant level and a physical reductant level is comparable. For example, the controller 170 or 270 interprets the first level output value from the physical level sensor 112 and determines if the physical level of the reductant in the tank 110 measured by the physical level sensor 112 is above the first threshold, as described before with respect to the aftertreatment system 100. The controller 170 or 270 can also determine if the reductant level measured by the physical level sensor 112 is comparable, for example within a predetermined value of a virtual reductant level measured by the controller 170 or 270 as described before.

It is determined if the above conditions are satisfied at 410. If any of the conditions of operation 402 or operation 404, and operation 406 and operation 408 are not satisfied, the tank is determined to be frozen at 412 i.e., the reductant contained within the tank is frozen. If all of the above conditions are satisfied, the method 400 determines if the vehicle is moving or stationary. For example, the aftertreatment system (e.g., the aftertreatment system 100) can be installed on a vehicle and configured to decompose constituents of the exhaust gas produced by the engine. The vehicle can include a vehicle speed sensor (e.g., the vehicle speed sensor 116) operatively coupled to a controller (e.g., the controller 170 or 270) configured to interpret a vehicle speed sensor output value to determine if the vehicle is moving or stationary.

If the vehicle is stationary, the method 400 determines if an ambient temperature is above an ambient temperature threshold and a PCB temperature is above a PCB temperature threshold (or temperature is good) or an expiration of a tank frozen time has occurred (or thaw is complete) at 414. If operation 414 is not satisfied, the method 400 determines that the tank is frozen at 412. If the operation 414 is satisfied, it is determined that the tank is not frozen at 420. For example, the controller 170 or 270 can interpret the ambient temperature sensor output value from the ambient temperature sensor 118, and the PCB temperature output value from the PCB temperature sensor 122. If the ambient temperature is above the ambient temperature threshold and the PCB temperature is also above the PCB temperature threshold, the reductant in the tank is determined to be in a liquid phase, i.e., not frozen.

Furthermore, the controller 170 or 270 can determine if the expiration of the tank frozen time has occurred, for example by determining the time elapsed since the heater 130 was turned on. If the time elapsed is greater than a threshold time, the controller 170 or 270 determines that expiration of the tank frozen time has occurred or otherwise the tank thaw is complete. If any of the above mentioned conditions are satisfied, the reductant in the tank (e.g., the tank 110) is determined to be in the liquid has (i.e., the tank is not frozen) at 420. If neither of these conditions is satisfied, the reductant in the tank is deemed to be frozen at 412.

If the vehicle is determined to be moving at operation 414, the method 400 determines if an ambient temperature is above an ambient temperature threshold and a PCB temperature is above a PCB temperature threshold (or temperature is good) or sufficient sloshing of the reductant exists within the reductant storage tank at 418, for example the sloshing of the reductant in the tank 110 is above a sloshing threshold. If it is determined that the temperature is good and sufficient sloshing exists than it is determined that the tank is not frozen at 420. If neither the temperature is good nor sufficient sloshing exists, the reductant in the tank is determined to be frozen at operation 412.

Figure 5:
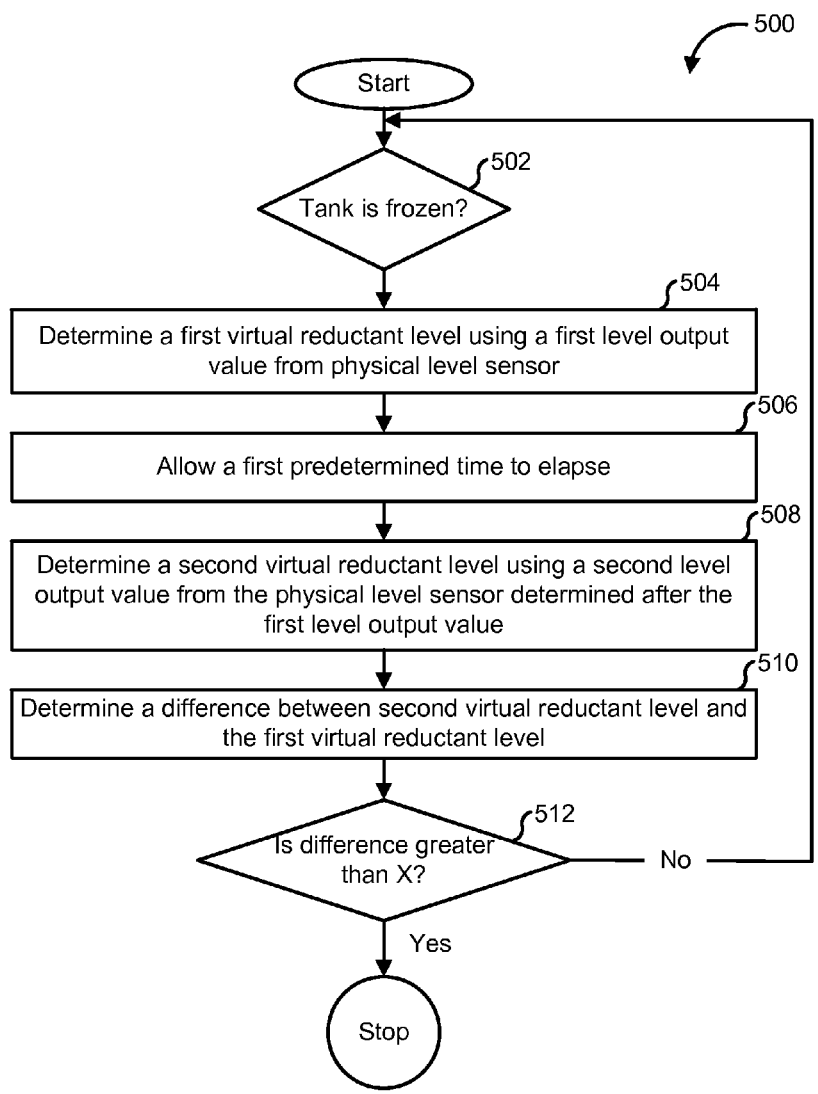
FIG. 5 is a schematic flow diagram of still another embodiment of a method for providing a virtual reductant level, and reverting to providing a physical reductant level if a second virtual reductant level is greater than a first virtual reductant level by a predetermined value or otherwise a drain of the reductant in the reductant storage tank is determined at when a key ON or startup of an engine or vehicle is detected.

FIG. 5 is a schematic flow diagram of an example method 500 for determining a virtual reductant level if a reductant contained within a reductant storage tank (e.g., the tank 110) is frozen and to stop measuring the virtual reductant level if a sufficient drain of the reductant from the tank is detected. The operations of the method 500 can be stored in the form of instructions on a non-transitory CRM (e.g., the main memory 736, read only memory (ROM) 738 or storage device 740 included in the computing device 730 of FIG. 7). The CRM can be included in a computing device (e.g., the computing device 730) which is configured to execute the instructions stored on the CRM to perform the operations of the method 400.

The method 500 includes determining a reductant contained with a reductant storage tank is frozen (or tank is frozen) at 502. For example, the controller 170 or 270 can determine that the first level output value from the physical level sensor 112 is below the first threshold, and the first temperature output value from the temperature sensor 114 is below the second threshold, or any other conditions described above with respect to method 400 are satisfied. If one or more of these conditions are satisfied as described before herein, the reductant in the tank (e.g., the tank 110) is determined to be frozen.

If the tank is determined to be frozen at 502, the method 500 determines a first virtual reductant level using a first level output value from a physical level sensor 504. For example, first level output value generated by the physical level sensor (e.g., the physical level sensor 112) can be a last known good level output value measured by the physical level sensor. The controller 170 or 270 can determine that the reductant in the tank 110 is frozen which implies that any level output value from the physical level sensor 112 will be unreliable. The controller 170 or 270 determines the virtual reductant level using the first level output value from the physical level sensor 112, for example sets the virtual reductant level to be equal to the first level output value, as described before A first predetermined time is allowed to elapse at 506. The first predetermined time can be, for example, 1 minute, 2 minutes, 3 minutes, 4 minutes, 5 minutes, 6 minutes, 7 minutes, 8 minutes, 9 minutes or 10 minutes inclusive of all ranges and values therebetween. After the first predetermined time has elapsed, a second virtual reductant level is determined using a second level output vale from the physical level sensor at 508. For example, the controller 170 or 270 can set the second virtual reductant level to be equal to the second level output value from the physical level sensor 112.

A difference between the second virtual reductant level and the first virtual reductant level is determined at 510. It is determined if the difference is greater than a predetermined value X at 512. The predetermined value X can be, for example in the range of 2% to 12%. If the determined value is not greater than X, the method returns to operation 502 and a new virtual reductant level can be determined using the first level output value after deducting an expected amount of reductant consumed during the passage of the predetermined time X from the first level output value, as described before.

In contrast, if the second difference between the second virtual reductant level and the first virtual reductant level is greater than the predetermined value X then the virtual reductant level is no longer determined and the method 500 stops. This can indicate that the reductant is being drained from the reductant storage tank, for example at key ON or an engine or vehicle startup, which includes the aftertreatment system (e.g., the aftertreatment system 100). This can indicate that the physical level sensor is reliably measuring the level of the reductant in the reductant storage tank. The physical reductant level measured by the physical level sensor (e.g., the physical level sensor 112) is then used for determining the reductant level in the reductant storage tank and indicated to a user.

Figure 6:
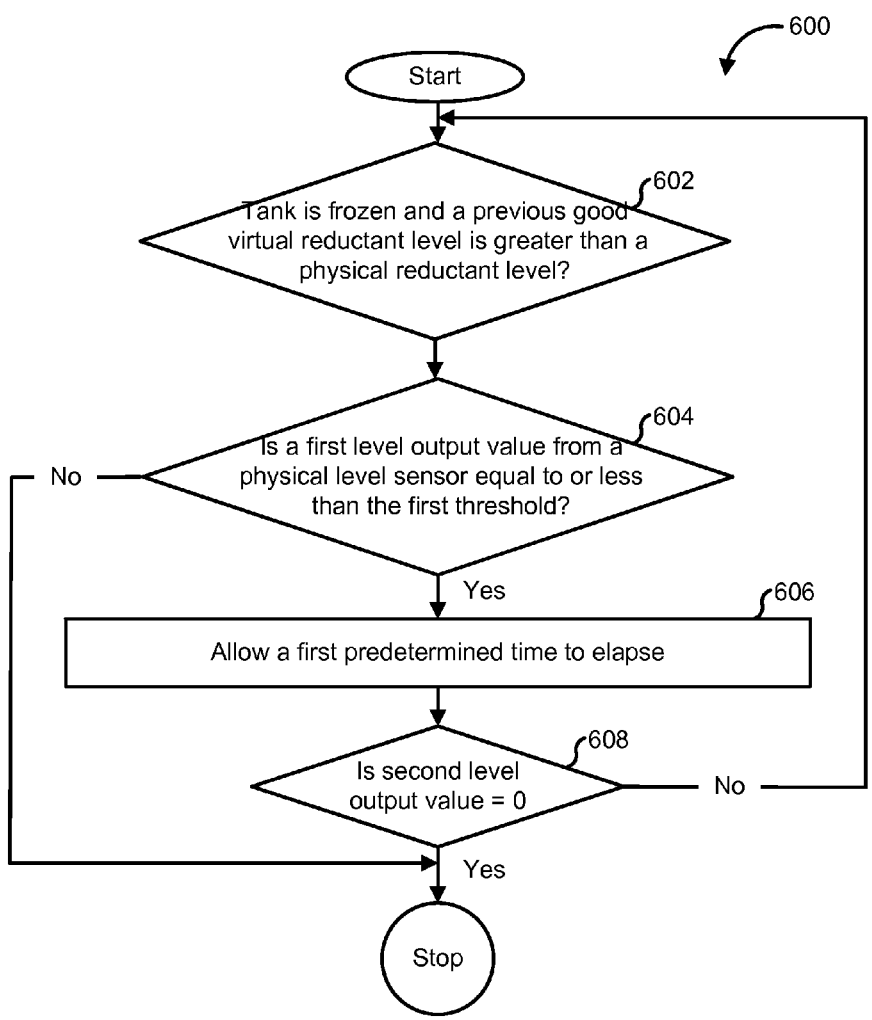
FIG. 6 is a schematic block diagram of yet another embodiments of a method for detecting a reductant drain of the reductant in a reductant storage tank when a key OFF or shut down of an engine or vehicle is detected.

FIG. 6 is a schematic flow diagram of an example method 600 for detecting a drain of a reductant at key OFF or engine or otherwise vehicle shut off using a reductant level output value measured by a physical level sensor (e.g., the physical level sensor 112). The operations of the method 600 can be stored in the form of instructions on a non-transitory CRM (e.g., the main memory 736, read only memory (ROM) 738 or storage device 740 included in the computing device 730 of FIG. 7). The CRM can be included in a computing device (e.g., the computing device 730) which is configured to execute the instructions stored on the CRM to perform the operations of the method 600.

The method 600 determines if the reductant in the reductant storage tank is frozen and a virtual reductant level is greater than a physical reductant level at 602. For example, the controller 170 or 270 can determine that the reductant in the tank 110 is frozen using, as described above. Furthermore, the controller 170 or 270 can determine if the virtual reductant level, which can be equal to a previous good physical reductant level measured by the physical level sensor 112, is greater than a physical reductant level measured by the physical level sensor 112.

If both these conditions are satisfied, it is determined if a first level output value from a physical level sensor is equal to or less than the first threshold at 604. If the first level output value is greater than the first threshold, this can indicate that the physical reductant level is functioning properly (e.g., the reductant in the tank has melted) and the method 600 stops. The actual physical reductant level measured by the physical level sensor can be indicated to the user.

However, if it is determined that the first level output value is equal to or less than the first threshold, this can, for example indicate that the reductant in the tank (e.g., the tank 110) is frozen and the physical level sensor (e.g., the physical level sensor 112) is unable to report an accurate physical reductant level, as described before. In this scenario, the method 600 proceeds to operation 606.

A first predetermined time is allowed to elapse at 606, for example about 1 minute, 2 minutes, 3 minutes, 4 minutes, 5 minutes, 6 minutes, 7 minutes, 8 minutes, 9 minutes or 10 minutes. The method 600 then determines if a second level output value from the physical level sensor is equal to 0. For example, the controller 170 or 270 can determine that the second level output value measured by the physical level sensor 112 is equal to zero. If the second level output value is greater than 0 but still less than the first threshold, the method 600 returns to operation 602. If however, the second level output value is equal to 0 even after the predetermined time has passed, this can indicate that the engine or vehicle that includes the aftertreatment system including the reductant storage tank is shut down or turned off or otherwise indicate a key OFF state, and the method 600 stops.

Figure 7:
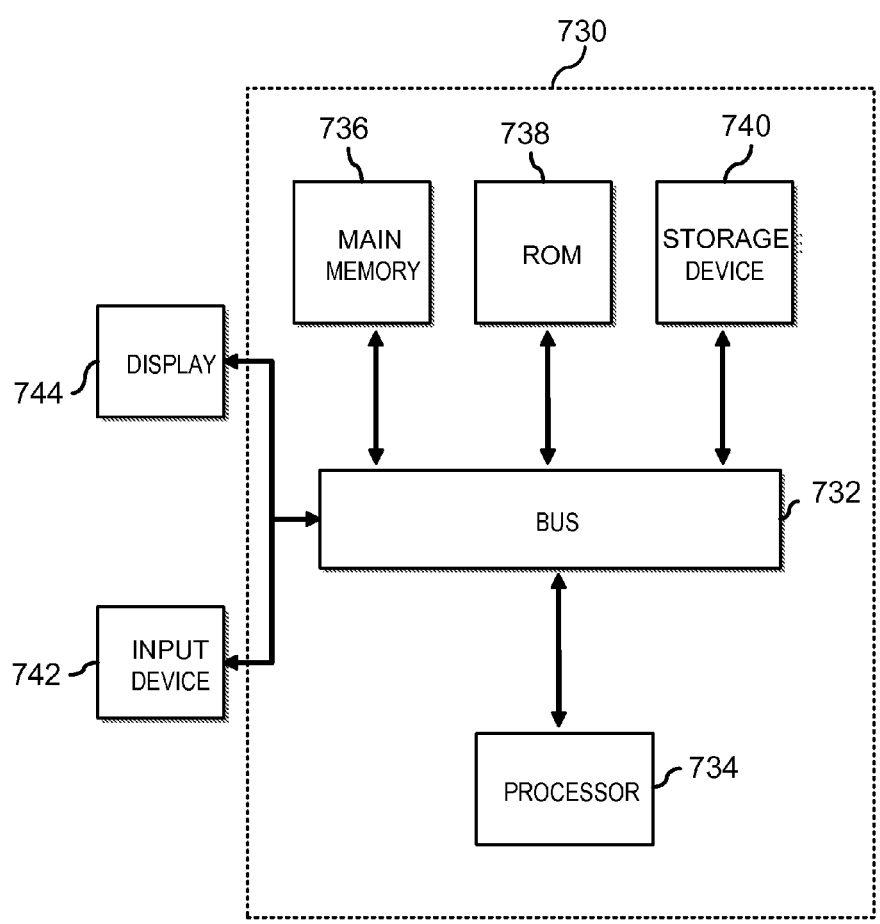
FIG. 7 is a schematic block diagram of an embodiment of a computing device which can be used as the controller of FIG. 1 and/or FIG. 2.

FIG. 7 is a block diagram of a computing device 730 in accordance with an illustrative implementation. The computing device 730 can be used to perform any of the methods or the processes described herein, for example the method 300, 400, 500 or 600. In some embodiments, the controller 170 or 270 can include the computing device 730. The computing device 730 includes a bus 732 or other communication component for communicating information. The computing device 730 can also include one or more processors 734 or processing circuits coupled to the bus for processing information.

The computing device 730 also includes main memory 736, such as a random access memory (RAM) or other dynamic storage device, coupled to the bus 732 for storing information, and instructions to be executed by the processor 734. Main memory 736 can also be used for storing position information, temporary variables, or other intermediate information during execution of instructions by the processor 734. The computing device 730 may further include a read only memory (ROM) 738 or other static storage device coupled to the bus 732 for storing static information and instructions for the processor 734. A storage device 740, such as a solid-state device, magnetic disk or optical disk, is coupled to the bus 740 for persistently storing information and instructions. For example instructions for determining if a reductant in the reductant storage tank is frozen and/or determining the virtual reductant level can be stored in any one of the main memory 736 and/or storage device 740. In one embodiment, the processor 734 can also be configured to generate a fault code if a physical level sensor (e.g., the physical level sensor 112) is unable to detect an accurate physical level of the reductant in the reductant storage tank for an extended period of time. The fault code can be stored, for example be stored on the main memory 736 and/or the storage device 740 to be reported to a user when the computing device 730 is accessed. In other embodiments, the processor 734 can indicate to a user that the physical level sensor has malfunctioned by light a malfunction indicator lamp (MIL), for example a MIL included in the dashboard of a vehicle.

The computing device 730 may be coupled via the bus 732 to a display 735, such as a liquid crystal display, or active matrix display, for displaying information to a user. An input device 742, such as a keyboard or alphanumeric pad, may be coupled to the bus 732 for communicating information and command selections to the processor 734. In another implementation, the input device 742 has a touch screen display 744.

According to various implementations, the processes and methods described herein can be implemented by the computing device 730 in response to the processor 734 executing an arrangement of instructions contained in main memory 736 (e.g., the operations of the method 300, 400, 500 or 600). Such instructions can be read into main memory 736 from another non-transitory computer-readable medium, such as the storage device 740. Execution of the arrangement of instructions contained in main memory 736 causes the computing device 730 to perform the illustrative processes described herein. One or more processors in a multiprocessing arrangement may also be employed to execute the instructions contained in main memory 736. In alternative implementations, hard-wired circuitry may be used in place of or in combination with software instructions to effect illustrative implementations. Thus, implementations are not limited to any specific combination of hardware circuitry and software.

Although an example computing device has been described in FIG. 7, implementations described in this specification can be implemented in other types of digital electronic circuitry, or in computer software, firmware, or hardware, including the structures disclosed in this specification and their structural equivalents, or in combinations of one or more of them.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various example embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system, comprising:
    a reductant storage tank;
    a selective catalytic reduction system fluidly coupled to the reductant storage tank, the selective catalytic reduction system including at least one catalyst;
    a reductant physical level sensor operatively coupled to the reductant storage tank;
    a tank temperature sensor operatively coupled with the reductant storage tank; and
    a controller communicatively coupled with each of the reductant physical level sensor and the tank temperature sensor, the controller configured to:
        interpret a first level output value from the physical level sensor, the first level output value indicative of a physical level of a liquid portion of a reductant in the reductant storage tank,
        interpret a first temperature output value from the tank temperature sensor, the first temperature output value indicative of a temperature of the reductant in the reductant storage tank,
        if the first level output value is below a first threshold, determine if the first temperature output value is below a second threshold,
        if it is determined that the first level output value is below the first threshold and the first temperature output value is below the second threshold, determine a virtual reductant level in the reductant storage tank, and
        indicate the virtual reductant level in lieu of an actual physical level of the reductant in the reductant storage tank to a user.

2. The aftertreatment system of claim 1, wherein the virtual reductant level corresponds to a previous level output value from the physical level sensor, the previous level output value indicative of an acceptable reductant level in the reductant storage tank.

3. The aftertreatment system of claim 2, wherein the controller is further configured to:
    interpret a second temperature output value from the tank temperature sensor a first predetermined time after interpreting the first temperature output value,
    if the second temperature output value is below the second threshold, determine a second virtual reductant level in the reductant storage tank using the previous output value from the physical level sensor, and indicate the second virtual reductant level in lieu of the actual physical level of the reductant in the reductant storage tank to the user.

4. The aftertreatment system of claim 3, wherein the controller is further configured to:
    determine a reductant consumption value using the previous output value from the physical level sensor and the first predetermined time, and
    subtract the reductant consumption value from the previous output value from the physical level sensor to determine the second virtual reductant level.

5. The aftertreatment system of claim 3, wherein the controller is further configured to:
    interpret a third temperature output value from the tank temperature sensor a second predetermined time after interpreting the second temperature output value,
    if the third temperature output value is above the second threshold, determine a third virtual reductant level using a second level output value measured by the physical level sensor, the second level output value indicative of a most recent actual physical level of reductant in the storage tank.

6. The aftertreatment system of claim 5, wherein the controller is further configured to:
    interpret a fourth temperature output value from the tank temperature sensor a third predetermined time after interpreting the third temperature output value,
    if the fourth temperature output value is above the second threshold, interpret a third level output value from the physical level sensor, the third level output value indicative of a most recent actual physical level of reductant in the reductant storage tank,
    determine the actual physical level of reductant in the reductant storage tank, and
    indicate the actual physical level of the reductant to the user.

7. The aftertreatment system of claim 1, wherein the aftertreatment system is included in a vehicle, and wherein the controller is communicatively coupled to at least one of a vehicle speed sensor, an ambient temperature sensor, a tank heater and a printed circuit board (PCB) temperature sensor, the controller further configured to:
    interpret at least one of:
        vehicle speed sensor output value to determine a vehicle speed,
        an ambient temperature sensor output value to determine an ambient temperature,
        a tank heater output value, and
        a PCB temperature sensor output value to determine a PCB temperature, and
    using the at least one of the vehicle speed, the ambient temperature, the tank heater output value and the PCB temperature, determine if the reductant contained within the reductant storage tank is frozen.

8. The aftertreatment system of claim 7, wherein the controller is configured to determine that the reductant in the reductant storage tank is frozen if:
    the first temperature output value of the tank temperature sensor is below the second threshold or the tank heater is on, and
    the virtual reductant level determined by the controller is greater than a physical reductant level of the reductant by a predetermined range indicated by the first level output value of the physical level sensor.

9. The aftertreatment system of claim 8, wherein the predetermined range is 2% to 12%.

10. The aftertreatment system of claim 7, wherein the controller is configured to determine that the reductant in the reductant storage tank is not frozen if:
the first temperature output value of the tank temperature sensor is above the second threshold or the tank heater is on;
the virtual reductant level determine by the controller is within a predetermined range of a physical reductant level of the reductant, indicated by the first output value of the physical level sensor; and
any one of:
an ambient temperature is above an ambient temperature threshold and a PCB temperature is above a PCB temperature threshold,
responsive to the vehicle moving, an indication of sloshing of the reductant in the storage tank above a sloshing threshold, and
responsive to the vehicle being stationary, an expiration of a tank frozen time.

11. A control module comprising:
a physical level sensor module configured to receive a first level output value from a physical level sensor operatively coupled to a reductant storage tank, the first level output value indicative of a physical level of a liquid portion of a reductant in the reductant storage tank;
a virtual level sensor module configured to determine a virtual reductant level of the reductant in the reductant storage tank; and
a determination module communicatively coupled to the physical level sensor module, the virtual level sensor module, and a temperature sensor, the determination module configured to:
interpret the first level output value,
interpret a first temperature output value from the temperature sensor,
if the first level output value is below a first threshold, determine if the first temperature output value is below a second threshold,
if it is determined that the first level output value is below the first threshold and the first temperature output value is below the second threshold, determine a virtual reductant level in the reductant storage tank; and
instruct the virtual level sensor module to indicate the virtual reductant level to a user.

12. The control module of claim 11, wherein the determination module is further configured to:
if it is determined that the first temperature output value is above the second threshold, determine a physical reductant level in the reductant storage tank, and
instruct the physical level sensor module to indicate the physical reductant level to the user.

13. The control module of claim 11, wherein the virtual reductant level corresponds to a previous level output value from the physical level sensor, the previous level output value indicative of an acceptable reductant level in the reductant storage tank.

14. The control module of claim 11, wherein the determination module is further configured to:
interpret a second temperature output value from the tank temperature sensor a first predetermined time after interpreting the first temperature output value;
if the second temperature output value is below the second threshold determine a second virtual reductant level in the reductant storage tank using the previous output value from the physical level sensor, and
instruct the virtual level sensor module to indicate the second virtual reductant level in lieu of the actual physical level of the reductant in the reductant storage tank to the user.

15. The control module of claim 14, wherein the determination module is further configured to:
determine a reductant consumption value using the previous output value from the physical level sensor and the first predetermined time, and
subtract the reductant consumption value from the previous output value from the physical level sensor to determine the second virtual reductant level.

16. The control module of claim 14, wherein the determination module is further configured to:
interpret a third temperature output value from the tank temperature sensor a second predetermined time after interpreting the second temperature output value,
if the third temperature output value is above the second threshold, determine a third virtual reductant level using a second level output value measured by the physical level sensor, the second level output value indicative of a most recent actual physical level of the reductant in the reductant storage tank.

17. The control module of claim 16, wherein the determination module is further configured to:
interpret a fourth temperature output value from the tank temperature sensor a third predetermined time after interpreting the third temperature output value,
if the fourth temperature output value is above the second threshold, interpret a third level output value from the physical level sensor, the third level output value indicative of a most recent actual physical level of reductant in the reductant storage tank,
determine the actual physical level of reductant in the reductant storage tank, and
instruct the physical level sensor module to indicate the actual physical reductant level to the user.

18. The control module of claim 11, wherein the determination module is communicatively coupled to at least one of a vehicle speed sensor, an ambient temperature sensor, a tank heater and a printed circuit board (PCB) temperature sensor, the determination module further configured to:
interpret at least one of a:
vehicle speed sensor output value to determine a vehicle speed,
an ambient temperature sensor output value to determine an ambient temperature,
a tank heater output value, and
a PCB temperature sensor output value to determine a PCB temperature; and
using the at least one of the vehicle speed, the ambient temperature, the heater output value and the PCB temperature, determine if the reductant contained within the reductant storage tank is frozen.

19. The control module of claim 18, wherein the determination module is configured to determine that the reductant in the reductant storage tank is frozen if:
the first temperature output value of the tank temperature sensor is below the second threshold or the tank heater is on; and
the virtual reductant level is greater than a physical reductant level of the reductant by a predetermined value.

20. The control module of claim 18, wherein the tank frozen determination module is configured to determine that the reductant in the reductant storage tank is not frozen if:

the first temperature output value of the tank temperature sensor is above the second threshold or the tank heater is on, the virtual reductant level is within a predetermined range of a physical reductant level, and any one of:
- an ambient temperature is above an ambient temperature threshold and a PCB temperature is above a PCB temperature threshold,
- responsive to the vehicle moving, an indication of sloshing of the reductant in the storage tank above a sloshing threshold, and
- responsive to the vehicle being stationary, an expiration of a tank frozen time.

21. A method for identifying a reductant freezing condition in a reductant storage tank having a physical level sensor and a tank temperature sensor operatively coupled thereto and for indicating a virtual reductant level in the reductant storage tank, comprising:

interpreting a first level output value from the physical level sensor, the first level output value indicative of a physical level of a liquid portion of a reductant in the reductant storage tank;

interpreting a first temperature output value from the tank temperature sensor, the first temperature output value indicative of a temperature of the reductant in the reductant storage tank;

determining if the first level output value is below a first threshold;

if the first level output value is below a first threshold, determining if the first temperature output value is below a second threshold;

if the first level output value is below the first threshold and the first temperature output value is below the second threshold, determining a virtual reductant level; and indicating the virtual reductant level to a user.

22. The method of claim 21, further comprising:

if the first level output value is above the first threshold, determining a physical reductant level from the first level output value; and indicating the physical reductant level to the user.

23. The method of claim 22, further comprising:

if the first temperature output value is above the second threshold, determining the physical reductant level from the first level output value; and indicating the physical reductant level to the user.

24. The method of claim 21, further comprising:

determining that the reductant in the reductant storage tank is at least partially frozen if:

the first temperature output value of the tank temperature sensor is below the second threshold or the reductant storage tank is being heated; and the virtual reductant level is greater than a physical reductant level of the reductant by a predetermined value.

25. The method of claim 21, further comprising:

determining that the reductant in the reductant storage tank is not frozen if:

the first temperature output value of the tank temperature sensor is above the second threshold or reductant storage tank is being heated;

the virtual reductant level is within a predetermined range of a physical reductant level, and any one of:
- an ambient temperature is above an ambient temperature threshold and a PCB temperature is above a PCB temperature threshold,
- responsive to the vehicle moving, an indication of sloshing of the reductant in the storage tank above a sloshing threshold, and
- responsive to the vehicle being stationary, an expiration of a tank frozen time.

* * * * *

UNITED STATES PATENT AND TRADEMARK OFFICE
CERTIFICATE OF CORRECTION

PATENT NO. : 9,664,083 B2
APPLICATION NO. : 14/826678
DATED : May 30, 2017
INVENTOR(S) : Nassim Khaled et al.

Page 1 of 1

It is certified that error appears in the above-identified patent and that said Letters Patent is hereby corrected as shown below:

On the Title Page

Item (72) Inventors:
Add -- Santosh Kumar Rata
Abhijeet Singh Chauhan --.

Signed and Sealed this
Thirty-first Day of March, 2020

Andrei Iancu
*Director of the United States Patent and Trademark Office*